(12) United States Patent
Kitamura et al.

(10) Patent No.: US 7,284,270 B2
(45) Date of Patent: Oct. 16, 2007

(54) IC CARD AND CARD CERTIFICATION METHOD

(75) Inventors: Shigehiro Kitamura, Hino (JP); Nobuyuki Ishii, Hino (JP); Hideki Takahashi, Hino (JP); Ryoji Hattori, Hino (JP)

(73) Assignee: Konica Corporation, Tokyo (JP)

( * ) Notice: Subject to any disclaimer, the term of this patent is extended or adjusted under 35 U.S.C. 154(b) by 979 days.

(21) Appl. No.: 10/236,688

(22) Filed: Sep. 6, 2002

(65) Prior Publication Data

US 2003/0065938 A1    Apr. 3, 2003

(30) Foreign Application Priority Data

Sep. 13, 2001  (JP)  ............................. 2001-278832

(51) Int. Cl.
| | |
|---|---|
| *G06F 12/14* | (2006.01) |
| *G06K 9/74* | (2006.01) |
| *G06K 7/10* | (2006.01) |
| *G06K 7/14* | (2006.01) |

(52) U.S. Cl. ....................................... 726/20; 235/380
(58) Field of Classification Search ................ 235/380, 235/491, 492; 726/20
See application file for complete search history.

(56) References Cited

U.S. PATENT DOCUMENTS

| | | | | | |
|---|---|---|---|---|---|
| 4,370,403 | A | * | 1/1983 | Takaki ...................... 430/271.1 |
| 4,968,873 | A | * | 11/1990 | Dethloff et al. ............. 235/380 |
| 4,999,601 | A | * | 3/1991 | Gervais ...................... 235/492 |
| 5,142,383 | A | * | 8/1992 | Mallik ............................ 359/2 |
| 5,231,570 | A | * | 7/1993 | Lee ............................... 705/38 |
| 5,358,582 | A | * | 10/1994 | Koshizuka et al. ......... 156/235 |
| 5,498,860 | A | * | 3/1996 | Ohno et al. ................. 235/384 |
| 5,521,831 | A | * | 5/1996 | May ............................ 235/380 |
| 5,534,372 | A | * | 7/1996 | Koshizuka et al. ........... 430/10 |
| 5,648,647 | A | * | 7/1997 | Seiler ......................... 235/380 |
| 5,694,471 | A | * | 12/1997 | Chen et al. ................... 705/76 |
| 5,717,776 | A | * | 2/1998 | Watanabe ................... 382/116 |
| 5,814,800 | A | * | 9/1998 | Marsh et al. ................ 235/448 |
| 5,825,882 | A | * | 10/1998 | Kowalski et al. ........... 713/172 |
| 5,888,624 | A | * | 3/1999 | Haghiri et al. ............ 428/195.1 |
| 6,207,004 | B1 | * | 3/2001 | Murasawa ................... 156/300 |
| 6,257,486 | B1 | * | 7/2001 | Teicher et al. .............. 235/380 |
| 6,488,211 | B1 | * | 12/2002 | Everett et al. .............. 235/492 |
| 6,773,626 | B2 | * | 8/2004 | Sanada et al. ......... 252/299.01 |
| 7,021,550 | B2 | * | 4/2006 | Uchihiro et al. ............ 235/492 |
| 2001/0011944 | A1 | * | 8/2001 | Garrido-Gadea et al. .. 340/5.86 |
| 2003/0205399 | A1 | * | 11/2003 | Uchihiro et al. ........... 174/52.4 |
| 2004/0129788 | A1 | * | 7/2004 | Takahashi et al. .......... 235/492 |

FOREIGN PATENT DOCUMENTS

EP        000458306 A2  *  11/1991

\* cited by examiner

*Primary Examiner*—Emmanuel L. Moise
*Assistant Examiner*—Tamara Teslovich
(74) *Attorney, Agent, or Firm*—Lucas & Mercanti, LLP

(57) ABSTRACT

An IC card comprising: a core layer comprising therein an electronic element having a memory medium; an image receptive layer recording at least either text information or image information; and an optical variation element layer comprising an optical variation element, wherein the memory medium stores a characteristic information of the optical variation element layer and at least either the text information or the image information.

19 Claims, 11 Drawing Sheets

IC CARD AND CARD CERTIFICATION METHOD

FIELD OF THE INVENTION

The present invention relates to an IC card (an integrated circuit card) which is suitably applied to a contact type or a non-contact type electronic or magnetic card or sheet, which stores personal information, for which security is required against forgery as well as falsification, and to a card certification method.

BACKGROUND OF THE INVENTION

Since personal information is recorded on credit cards, employee identification cards, company worker identification cards, membership cards, student identification cards, alien registration cards, and various licenses, security processes are applied to these cards so that forgery as well as falsification is not easily performed.

For example, Japanese Patent Application Laid-Open to Public Inspection No. 53-9600 and Japanese Patent Examined Publication No. 54-22326 disclose bar code printed cards secured against forgery and falsification, comprising an infrared ray emitting layer which absorbs infrared rays, and subsequently emits infrared rays having different wavelengths from the absorbed infrared rays. Further, forgery and falsification are thwarted by providing an optical variation element image.

In recent years, from the viewpoint of further enhancing security, IC cards have been employed which comprise, in their interior, an electronic element comprising memory medium featuring a so-called IC (integrated circuit).

In such IC cards, security is enhanced by utilizing cryptographic techniques as well as key techniques. In an IC card comprising information described on its surface, it is important that it is possible to confirm that contents described on the surface coincide with information stored in the memory of the electronic part provided in the IC card. Namely, there may be a case in which only its surface is forged through replacement and the function of the IC card is put to improper use.

In order to prevent such cases, it is recommended to always confirm that items described on the surface coincide with the contents stored in the memory. However, at present, it is very difficult to realize the foregoing.

Further, in order to enhance security of IC cards, a printed image such as a logo printed pattern is occasionally provided in the interior of the cards. On the other hand, occasionally, it is desired to confirm the structure of an IC chip or an antenna which can be viewed through its surrounding medium. In such a case, providing the printed image occasionally hinders to confirm the structure of the IC chip as well as the antenna.

Still further, electronic parts such as an IC chip and an antenna, which are provided in the interior of the cards, occasionally shield a printed image, included as a watermark, and degrade readability of the printed image.

SUMMARY OF THE INVENTION

From the viewpoint of the foregoing, the present invention was achieved. An aspect of the present invention is to provide an IC card having a function which detects whether the IC card is forged or not, and specifically a function which easily detects whether the contents described on the surface of the IC card were replaced or not, and a card certification method.

Another aspect of the present invention is to provide an IC card which makes it possible to view the IC chip as an electronic part and an antenna image through their surroundings, while temporarily erasing a printed image in the interior of the card, as well as an IC card exhibiting enhanced security against forgery as well as falsification, and a card certification method.

Still another aspect of the present invention is to provide an IC card which does not degrade the readability of a printed image provided as a watermark due to shielding of an electronic part, as well as an IC card exhibiting enhanced security against forgery, as well as falsification, and a card certification method.

In order to solve the afore the problems, as well as to achieve the afore the aspects, the present invention was structured as described below.

Structure 1

An IC card comprising a core layer comprising therein an electronic element having a memory medium, an image receptive layer recording at least either text information or image information, and an optical variation element layer comprising an optical variation element. In the IC card, at least either the text information or the image information, as well as characteristic information of the optical variation element layer, is stored in the memory medium.

Based on the structure, it is possible to ascertain the genuineness of the IC card while comparing the characteristic information of the practical optical variation element image to the characteristic information previously stored in the memory medium, resulting in excellent security against forgery as well as falsification.

The above-described characteristic information preferably comprises at least the measurement position information of the optical variation element, the incident angle of exposure light, the measurement angle, and colorimetric values.

Based on the structure, simply and securely, it is possible to ascertain the genuineness of the IC card while comparing the characteristic information of the practical optical variation element image to the characteristic information previously stored in the memory medium.

It is preferable that the optical variation element layer is positioned on the opposite side of the image receptive layer with respect to the core layer.

Structure 2

A card certification method employing the IC card of Structure 1, comprising:
  reading the characteristic of the optical variation element image layer and the characteristic information stored in the memory medium;
  comparing the characteristic of the optical variation element image layer to the characteristic information stored in the memory medium; and
  permitting access to information stored in the memory medium other than the characteristic information of the optical variation element image layer when the characteristic of the optical variation element layer agrees with the characteristic information of the optical variation element layer stored in a memory medium.

Based on the structure, forgery and falsification are efficiently thwarted in such a manner that genuineness of the IC card is ascertained by comparing the characteristic of a practical optical variation element image to the characteristic information previously stored in the memory medium in the IC card and subsequently, access is permitted to other information stored in the memory medium.

Structure 3

An IC card comprising a core layer comprising therein an electronic element having a memory medium, an image receptive layer in which at least either text information or image information is recorded, and a variable and reversible printed image in the interior of the IC card. In the IC card, at least either the text information or the image information, as well as the characteristic information of the printed image is stored in the memory medium.

When an IC card is employed, it is occasionally desired to confirm structures of the IC chip and the antenna through their surrounding medium. However, when a printed image is provided, it becomes difficult to accomplish such confirmation. However, based on the structure, it becomes possible to view the images of the electronic parts through the surrounding medium by temporarily erasing the printed image. As a result, it is possible to ascertain the genuineness of the IC card while inspecting whether the printed image is reversible or not. Further, it is possible to more efficiently prevent forgery as well as falsification by ascertaining genuineness of the card through analyzing the optical characteristics before and after the reversing process, while comparing the variability and the reversibility of the practical printed image to the characteristic information of the variable and reversible printed image stored in the memory medium.

The above-described characteristic information of the variable and reversible printed image stored in the memory medium preferably comprises at least one of the optical characteristic information before variation of the printed image and the optical characteristic information after the variation. It is more preferable that the characteristic information of the variable and reversible printed image stored in the memory medium comprises both the optical characteristic information before variation of the printed image and the optical characteristic information after variation. It is still more preferable that the characteristic information of the variable and reversible printed image stored in the memory medium further comprises information of means which varies the optical characteristics of the printed image.

Based on these structures, it is possible to ascertain the genuineness of the card through analyzing the optical characteristics of the printed image before and after the variation.

It is preferable that the IC card comprises a reflection layer and the printed image is provided between the reflection layer and the core layer.

The printed image in the IC card is preferably a logo printed pattern.

Structure 4

A card certification method employing the IC card of Structure 3, comprising:
reading the characteristic of the printed image and the characteristic information of the printed image stored in the memory medium;
comparing the characteristic of the printed image to the characteristic information stored in the memory medium; and
permitting access to information stored in the memory medium other than the characteristic information of the printed image when the characteristic of the printed image agrees with the characteristic information of the printed image stored in the memory medium.

Based on the structure, the genuineness of the IC card is ascertained while comparing the characteristic such as the variability and the reversibility of a printed image to the characteristic information stored previously in the memory medium in the interior of the IC card, and subsequently, access to other memory information in the interior of the memory is allowed. By so doing, it is possible to assuredly thwart forgery as well as falsification.

Structure 5

An IC card comprising a core layer comprising therein an electronic element having a memory medium, a first sheet member on the core layer, a second sheet member on the opposite side of the first sheet member, and an image recording section on the outside of at least one of the first and second sheet members. In the IC card, the transmission density of each of the first and the second sheet members is preferably from 0.60 to 1.80. The reflection density of each of the first and second sheet members is preferably at most 0.20. The opacity of each of the first and the second sheet members is preferably not less than 90. The opacity of the core layer is preferably not more than 70. In addition, a printed image layer having a printed image is preferably provided either between the first sheet member and the core layer or between the second sheet member and the core layer. Further, the printed image layer preferably has a transmission density of not less than 0.05 and has a reflection density of not more than 0.70.

Based on the structure, it is possible to clearly recognize a printed image under specified viewing conditions. For example, when the back surface of the IC card or the card surface is exposed to light, it is possible to view the printed image, which is not visible under normal observation, even in the presence of electronic elements such as a IC chip and an antenna.

In the IC card of Structure 5, the printed image layer is preferably positioned in the range of 3 to 30 percent from the surface of the IC card with respect to the card thickness.

When it is assumed that the printed image may be polished from the surface or peeled off, it is preferable that the printed image is positioned near the uppermost surface of the card. However, the printed image, which is positioned too close to the surface, may be noticed through the surface. Therefore, the printed image layer is preferably positioned in the range of 3 to 30 percent from the uppermost surface with respect to the card thickness.

In the IC card in Structure 5, the core layer preferably comprises a light storage material.

Based on the structure, due to the presence of the light storage material, light is kept emitting for some time after the cross-section of the card is exposed to high intensity light. Therefore, even after terminating light exposure to the cross-section, the printed image may be noticed for some time through its surrounding medium, as if it is still exposed to light.

In the IC card of Structure 5, it is preferable that a first printed image layer is provided between the first sheet member and the core layer, and a second printed image layer is provided between the second sheet member and the core layer. Further, it is more preferable that the printed image of the first printed image layer is different from the printed image of the second printed image layer in at least one of the position, the shape and the direction viewed from the upper surface.

Based on these structures, by making the first printed image layer different from the second printed image layer, it is possible to make a directly viewed image different from an image which is incorporated in a card and is viewed while light is exposed to the back surface of the card.

Each of the printed image of the first printed image layer and the printed image of the second printed image layer is comprised of an assembly of regular patterns which is designed to generate a new image due to moire effect when the first printed image layer and the second printed image layer are viewed upon being superimposed.

Based on the structure, it is possible to observe moire fringes only at the specified position of the portion where the angle of one group consisting of many fine lines is slightly different from the angle of another group consisting of many other fine lines. On the other hand, by arranging the fine lines approximately at right angle, the moire fringes are not formed and such fine lines result in effect as a uniform shielding layer. As a result, it is possible to design the front sheet to be thinner and to employ a base material sheet having a low shielding capability. Further, a fine line pattern may be formed employing a regularly arranged dot pattern. In the case of the dot, it is possible to generate moire fringes by superimposing dot arrangements while varying the angle between the arrangements.

In the IC card of Structure 5, it is preferable that the characteristic information of the printed image layer is stored in the memory medium.

A card certification method employing the IC card described in Structure 5, comprising:
 a first recognizing step to recognize the printed image from the surface of the IC card while exposing illuminant light to the back surface of the IC card;
 a second recognizing step to recognize the printed image from the surface of the IC card while exposing illuminant light to the side of the IC card; and
 a comparing step to compare the printed image recognized in the first recognizing step to the printed image recognized in the second recognizing method.

Based on the structure, it is possible to efficiently thwart forgery as well as falsification of the IC card by ascertaining the genuineness of the card, while comparing the printed image recognized employing light exposure to the back surface of the card to the printed image recognized employing exposure light to the back surface as well as to the card cross-section.

PREFERRED EMBODIMENTS OF THE INVENTION

The IC card as well as the card certification method of the present invention will now be described with reference to drawings. However, the present invention is not limited to these embodiments.

Figure 1:
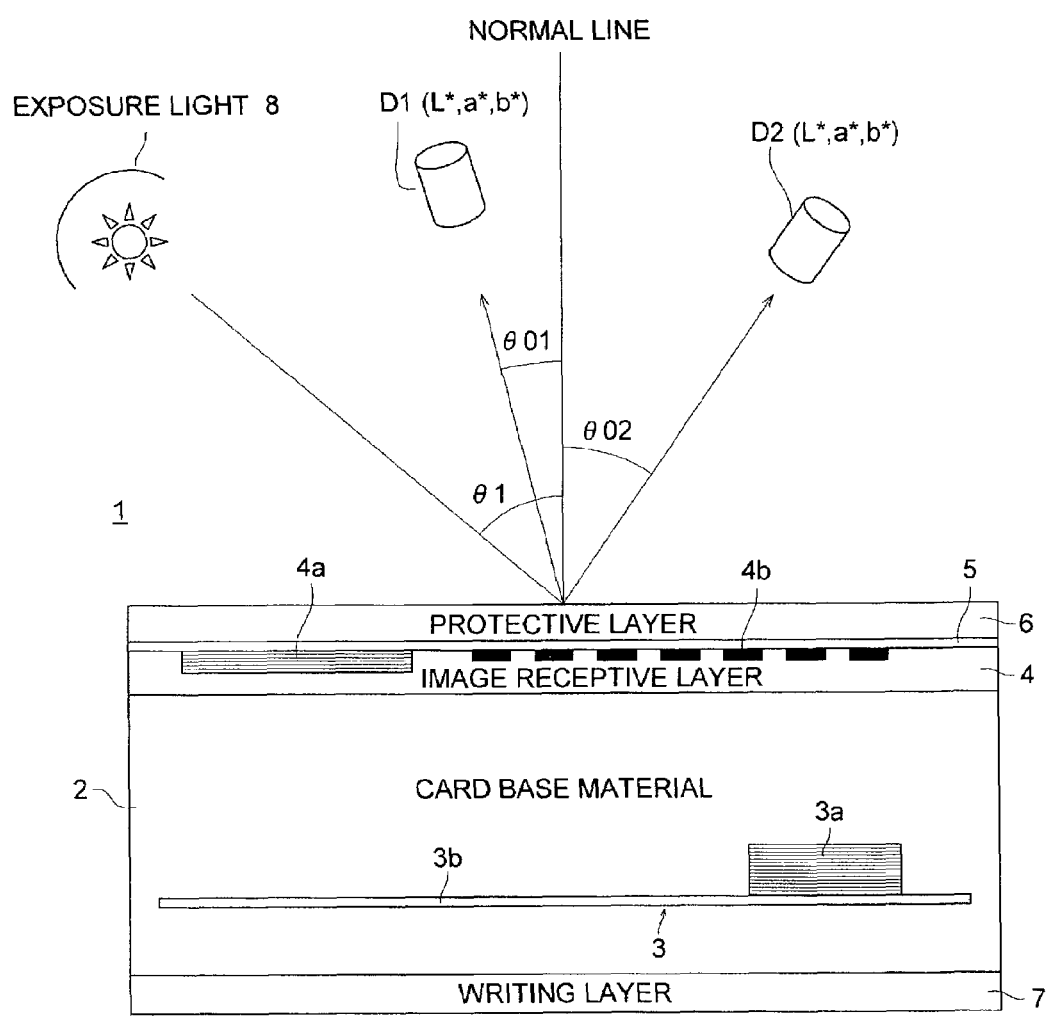
FIG. 1 is a view showing the cross-section of an IC card as well as a card certificating method according to one embodiment of the present invention.
Figure 2:
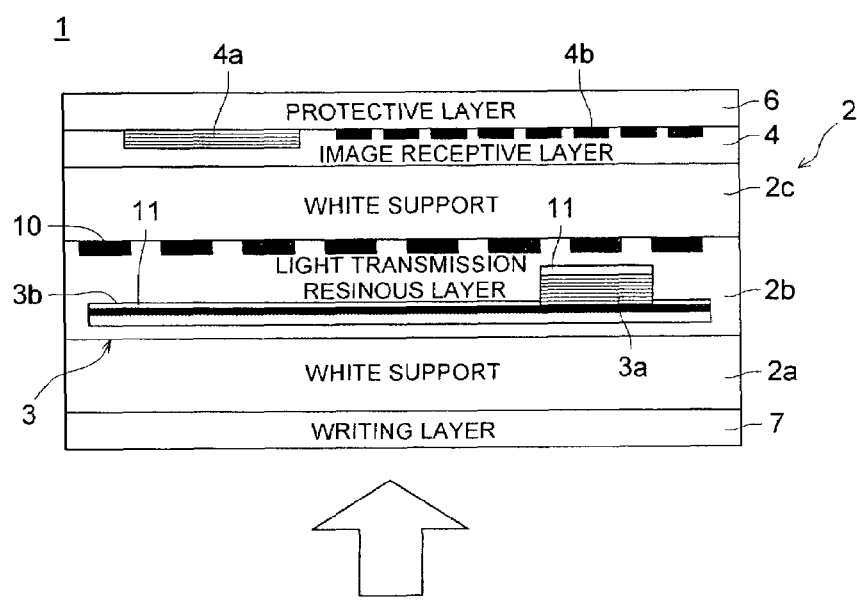
FIG. 2(a) is a view showing the cross-section of an IC card as well as a card certificating method according to another embodiment of the present invention.
FIG. 2(b) is an upper surface view of the IC card of FIG. 2(a).
Figure 2:
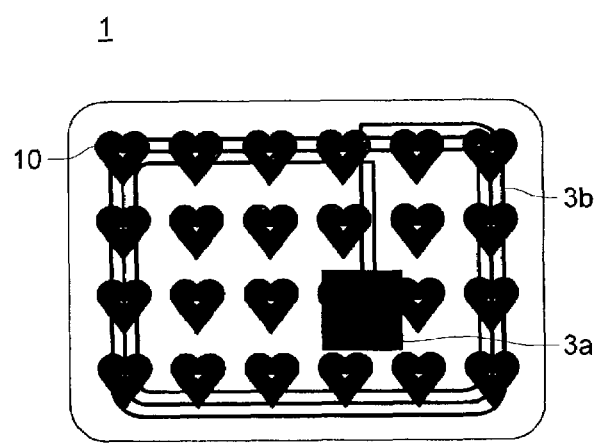
Figure 3:
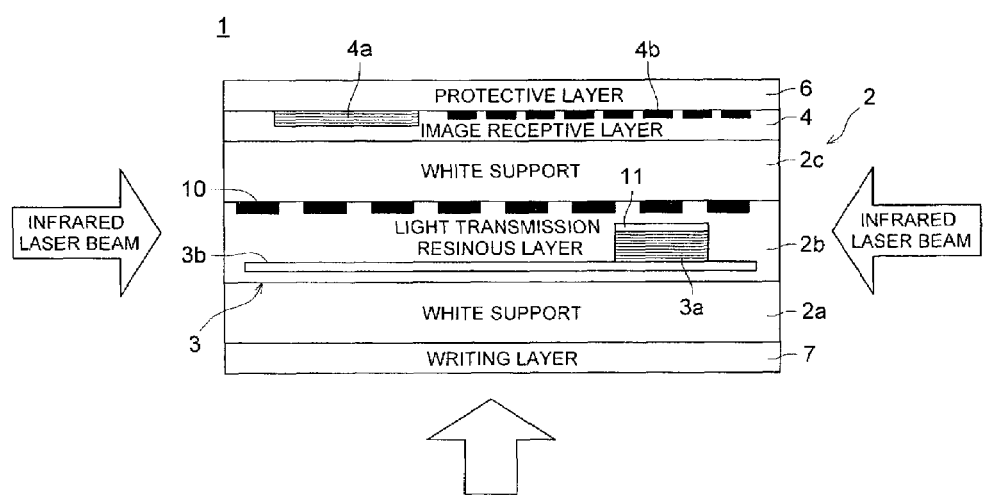
FIG. 3(a) is a view showing the cross-section of an IC card as well as a card certificating method according to another embodiment of the present invention.
FIG. 3(b) is an upper surface view of the IC card of FIG. 3(b).
Figure 3:
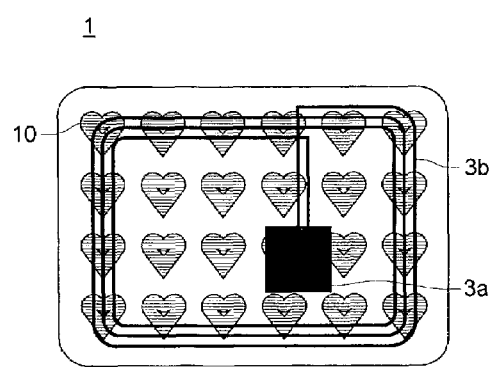
Figure 4:
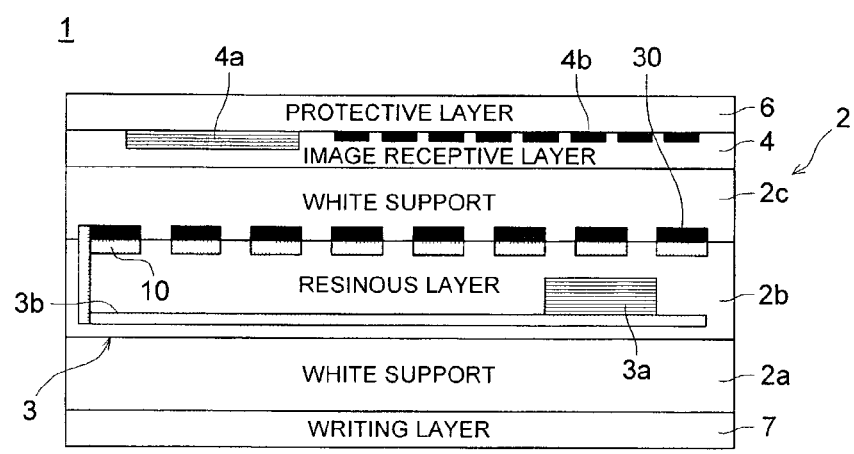
FIG. 4(a) is a cross-sectional view of an IC card according to another embodiment of the present invention.
FIG. 4(b) is an upper surface view of the IC card of FIG. 4(a).
Figure 4:
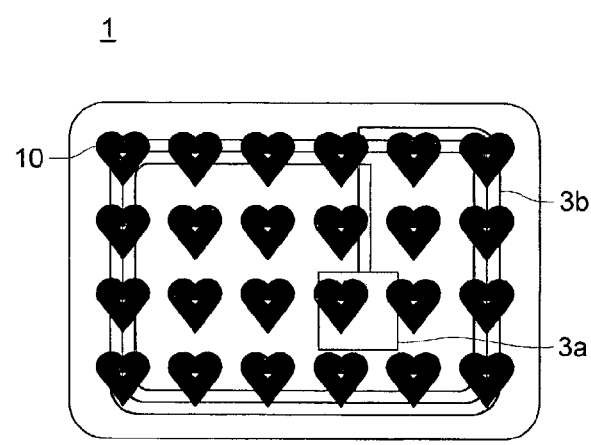

FIG. 1 is a view showing an IC card as well as a card certification method. IC card 1 in this embodiment comprises card base material 2 (being a core layer) having therein electronic parts 3 consisting of IC chip 3a as well as antenna 3b, and having thereon image receptive layer 4, optical variable element layer 5 and protective layer 6, in the order. Recording image 4a, such as a portrait, as well as bibliographic information 4b comprised of addresses and names, is recorded in the image receptive layer 4 of the IC card. On the surface side, recording information such as personal information is described and optical variable element layer 5 comprises an optical variable element image. On the opposite side of the card base material, writing layer 7 is provided.

Light 8 is exposed to the surface of the IC card 1, and subsequently, an optical variable element image is determined through the resultant reflection light employing photometric elements D1 and D2, whereby genuineness of the IC card 1 is ascertained. During the operation, measurement conditions are such that the incident angle of light 8 is θ, the measurement angle of the photometric element D1 is θ01, and the measurement angle of the photometric element D2 is θ02. It is possible to obtain colorimetric values (L*, a*, b*), employing photometric elements D1 and D2.

The characteristic information of the optical variation element image, together with recording information such as personal information, is stored in the interior memory medium of IC chip 3a of electronic parts 3. The characteristic information of the optical variation element image is comprised of at least the afore the measurement position information, incident light angle θ1, measurement angles θ01 and θ02, and colorimetric values (L*, a*, b*). The memory of measurement position information preferably relates to a plurality of positions. Further, information such as the total card thickness may be included. By so doing, it is possible to detect additional adhesion.

Further, a plurality of pieces of information of the incident angle may be stored in the memory. Still further, information of measurement direction angle which shows the measurement angle in either the longitudinal or lateral direction of the card may also be stored in the memory.

As mentioned previously, it is possible to more effectively thwart forgery as well as falsification in such a manner that genuineness of cards is ascertained by comparing the characteristic information of the optical variation element image arranged on the card surface to the characteristic information previously stored in the memory medium in the interior of the IC card, and access is allowed to other stored information in the interior of the memory medium.

<Supports>

Listed as supports of the card base material are, for example, polyester resins such as polyethylene terephthalate, polybutylene terephthalate, polyethylene terephthalate/isophthalate copolymers; polyolefin resins such as polyethylene, polypropylene, and polymethylpentane; polyethylene fluoride based resins such as polyvinyl fluoride, polyvinylidene fluoride, polyethylene tetrafluoride, and ethylene-ethylene tetrafluoride copolymers; polyamides such as nylon 6 and nylon 6.6; vinyl polymers such as polyvinyl chloride, vinyl chloride/vinyl acetate copolymers, ethylene/vinyl acetate copolymers, ethylene/vinyl alcohol copolymers, polyvinyl alcohol, and vinylon; biodegradable resins such as biodegradable aliphatic polyester, biodegradable polycarbonate, biodegradable polylactic acid, biodegradable polyvinyl alcohol, biodegradable cellulose acetate, and biodegradable polycaprolactone; cellulose based resins such as cellulose triacetate and cellophane; acryl based resins such as methyl polymethacrylate, ethyl polymethacrylate, ethyl acrylate, and butyl polyacrylate; synthetic resin sheets such as polystyrene, polycarbonate, polyallylate, and polyimide; or paper such as fine-quality paper, tissue paper, glassine paper, and sulfate paper; and single layer bodies such as metal foils or at least two layer laminated bodies thereof.

The support may have a single layer structure or a multilayer structure. In the present invention, fluorescent materials may be incorporated in the supports. Further, in order to enhance visibility of images formed in the following process, it is preferable that white pigments such as titanium white, magnesium carbonate, zinc oxide, barium sulfate, silica, talc, clay, and calcium carbonate are previously incorporated into the supports.

Further, the surface of the support may be subjected to an easy adhesion treatment which forms a layer comprised of coupling agents, latexes, and hydrophilic resins. In some cases, the supports may be subjected to an easy adhesion treatment such as a corona treatment or a plasma treatment.

If desired, the support may be provided with embossing, a signature, an IC memory, an optical memory, a magnetic recording layer, and the others such as printing. In order to form a portrait of the bearer of the card, an image receptive layer as well as a cushion layer may be provided.

<Image Receptive Layer>

An image receptive layer provided on the surface of a support may be formed employing binders as well as various types of additives.

It is preferable that the image receptive layer in the present invention is a thermal transfer recording image receptive layer which is laminated with a thermal transfer dye receptive layer. It is more preferable that a gradation information containing image is formed employing a sublimation type thermal transfer system and an image comprising text information is formed employing a sublimation type thermal transfer system or a hot melt type thermal transfer system. Accordingly, it is preferable that sublimation dyes, as well as hot melt ink, are adhered as desired. In order to provide such specified properties to the image receptive layer, it is necessary to appropriately select kinds of various additives and to suitably adjust the added amount of the additives. Further, an image receptive layer for ink jet printing may be utilized.

<Optical Variation Element Layer>

It is preferable that the optical variation element layer is comprised of a hologram image, multi-angle discoloring scale pigment ink, iris ink, or pearl pigments.

For example, it is possible to form the optical variation element layer in such a manner that transfer is carried out by adhering a hologram transfer foil onto the image receptive layer. Employed as the hologram transfer foils may be a relief type hologram. The relief type hologram is prepared by laminating a hologram forming layer and a hologram effect layer in the order. Specifically speaking, for example, formed on the surface of a support film, such as a polyethylene terephthalate film, is a thermoplastic resinous layer which is solid at room temperature such as a thermoplastic electron beam hardening resinous layer (being a hologram forming layer). Subsequently, the resultant surface is pressed with a hologram master plate on which a hologram interference pattern is formed as a relief so that the relief is transferred onto the resinous surface and subsequently is hardened. Thereafter, formed on the resultant relief is a thin hologram effect layer which is comprised of materials (for example, a vacuum deposited layer comprised of $TiO_2$, $SiO_2$, and ZnS) which provides desired transparency as well as desired peak reflection properties at a certain angle. Holograms, which reproduce images under white light such as daylight and room light, reproduce visible hologram images under common conditions. Therefore, such holograms are advantageous for decoration. On the other hand, those types, in which images are reproduced employing a laser beam, result in excellent detectability of forgery.

The scale pigment layer is formed by printing ink which is prepared by employing scale powders, or transferring a coating comprised of a mixture consisting of suitably selected binder resins known in the art and scale pigments. Listed as representative examples of the binder resins may be, for example, actinic radiation hardening resins, methyl polymethacrylate based acrylic resins, polystyrene based resins such as polystyrene, vinyl chloride based resins such as polyvinyl chloride, polyvinylidene based resins such as polyvinylidene chloride, polyester based resins such as polyethylene terephthalate, cellulose based resins such as cellulose acetate, polyvinyl acetal based resins such as polyvinyl butyral, epoxy based resins, amide based resins, urethane based resins, melamine based resins, alkyd based resins, phenol based resins, fluorine based resins, silicon based resins, polycarbonates, polyvinyl alcohols, and gelatin. In the present invention, the binders are preferably actinic radiation hardening resins described in C-2.

When the actinic radiation hardening resins are employed, they are hardened by exposure of the actinic radiation in an amount of 100 to 500 mJ, employing radiation sources such as a mercury arc, a UV lamp, or a xenon lamp.

Further, when a coating, comprised of a mixture comprising scale powders, is prepared, it is preferable that pigments are added to the binder resins, and the resultant mixture is blended employing homogenizers such as a ball mill, an attriter, a sand mill, or a kneader. If desired, other additives may be added and specifically additives, such as transparent vehicles, white pigments, and waxes, and hardening agents, may be employed.

FIGS. 2(a) through 4(b) are views of IC cards and card certification methods of other embodiments. In these embodiments, the same components as those of the structure in FIG. 1 are represented by the same code numbers as in FIG. 1, and the description is abbreviated.

IC card 1, which is structured as shown in FIGS. 2(a) and 2(b), comprises card base material 2 comprised of white support 2a, light transmission resinous layer 2b (a core layer), and white support 2c. Electronic parts 3 are provided in the light transmission resinous layer 2b. In IC chip 3a and antenna 3b of electronic parts 3, light reflection layer 11 may be provided. In the present invention, exhibiting variability and reversibility refers to properties capable of varying states such as density and at least returning to the original state. The properties are preferred which substantially return to the original state. Further, it is preferable that a printed image is a logo printed pattern.

As shown in FIG. 2(a), commonly, by exposing light onto the surface of writing layer 7, electronic parts 3 and printed image 10 are viewed while superimposed, as shown in FIG. 2(b).

IC card 1, which is structured as shown in FIGS. 3(a) and 3(b), comprises card base material 2 in the same manner as the embodiment of FIG. 2(a), and electronic parts 3 is provided in light transmission resinous layer 2b (a core layer). Further, variably reversible printed image 10 is provided in the light transmission resinous layer 2b. Light reflection layer 11 may be provided on chip 3a of the electronic parts 3.

As shown in FIG. 3(a), light is exposed onto the surface of writing layer 7 and in addition, an infrared laser beam is exposed to both sides of light transmission resinous layer 2b. By so doing, it is possible to let printed image 10 emit colored light so as to be easily readable. On the contrary, as shown in FIG. 3(b), by exposing an infrared radiation (being an infrared laser beam) to the side surface of the card, logo printed pattern 10 is subjected to variation so as to be discolored. Thereafter, by exposing light only to the surface of the writing layer, it is possible to view the emphasized pattern of the electronic parts.

IC card 1, which is structured as shown in FIGS. 4(a) and 4(b), comprises card base material 2 comprised of white support 2a, resinous layer 2b, and white support 2c, and electronic parts 3 is provided in resinous layer 2b. Further, variable reversal printed image 10 is provided in light transmission resinous layer 2b, and resistor layer 30 is provided while corresponding to printed image 10.

As shown in FIG. 4(a), electric power, which is generated by electromagnetic induction, is supplied from IC chip 3a to provided resistor layer 30 via antenna 3b. Subsequently, as shown in FIG. 4(b), it becomes possible to make printed image 10 visible, utilizing generated heat.

Optionally employed as printed image 10 may be images such as text, logos, and patterns. Generally, the printed image 10 is formed employing printing and stamping. Transmission density may be easily determined employing an optical transmission densitometer fitted with Wratten Filter NO. 106.

Preferably employed as materials of printed images are reversible thermosensitive ink and light storage materials.

In regard to materials employing reversible thermosensitive ink, for example, Japanese Patent Publication Open to Public Inspection Nos. 63-107584, 4-78573, and 4-358878 disclose polymer type reversible thermosensitive recording materials utilizing variation of transparency depending on heating conditions. In addition, proposed are dye type reversible thermosensitive recording materials capable of carrying out reversible recording while employing dyes used in thermosensitive recording materials. The dye type reversible thermosensitive recording materials result in relatively high contrast due to the fact that colored images are easily formed on a white background and the recording system utilizes variation of absorption wavelength depending on heating conditions. Known as systems for the dye type reversible thermosensitive recording materials are, for example, those described below.

Japanese Patent Publication Open to Public Inspection Nos. 58-191190 and 60-193691 disclose a method in which gallic acid and phloroglucinol are employed as a developer. Japanese Patent Publication Open to Public Inspection Nos. 60-264285 and 62-140881 disclose thermochromic materials exhibiting hysteresis. Japanese Patent Publication Open to Public Inspection No. 63-173784 discloses a method in which ascorbic acid derivatives are employed as a developer.

Japanese Patent Publication Open to Public Inspection Nos. 2-188293 and 2-188294 disclose a method in which salts of specified organic acids such as gallic acid with higher aliphatic amines are employed as a developer. Japanese Patent Publication Open to Public Inspection Nos. 5-124360 and 6-210954 disclose a method in which organic phosphonic acids having a long chain alkyl group or phenolic compounds are employed as a developer. Japanese Patent Publication Open to Public Inspection Nos. 6-344672 and 6-344673 disclose a method in which an overcoat layer, which has been hardened upon being exposed to an election beam, is applied onto a reversible thermosensitive layer in which the phenolic compounds, having a long chain alkyl group, is employed as a developer. Japanese Patent Publication Open to Public Inspection No. 9-99640 discloses a material in which dye precursors are incorporated together with aromatic compounds having a long chain alkyl group having at least 11 carbon atoms and a sulfonyl (thio) urea group as a developer in the thermosensitive recording layer of a reversible thermosensitive recoding material and an electron beam hardening type overcoating layer is provided on the thermosensitive recording layer.

Further, Japanese Patent Publication Open to Public Inspection No. 8-132744 discloses a reversible thermosensitive recording medium which is comprised of a thermosensitive recording layer of which transparency (optical density) reversibly varies depending on temperature during recording and a light-to-heat conversion layer in which an absorbed laser beam is converted to heat, and in which, specifically, when the medium is exposed to a laser beam for writing, the power range of the effective laser beam during recording is broadened by minimizing the temperature difference in the thickness direction in the thermosensitive layer caused by heat converted from the laser beam and further, when recording is erased by laser beam exposure, laser beam recording sensitivity of its milky-white portion and transparent portion remains constant.

Further, as one type of optical information recording media, there is an add-on capable type recording medium in which recording is carried out by forming pits on a recording layer such as a thin metal layer or a thin organic dye layer, employing heat which is generated by light exposure, and information is reproduced employing variation of optical characteristics of the pits. As a reversible optical recording medium, which is capable of easily carrying out recording, reproduction, and elimination of optical information, one employing thermotropic liquid crystals, which result in reversible phase transition, are disclosed in, for example, Japanese Patent Publication Open to Public Inspection No. 61-78689.

Further, for example, Japanese Patent Publication Open to Public Inspection Nos. 54-41902 and 59-185048 disclose optical recording media employing photochromic materials (spiropyran based materials and phthalide based materials) of which absorbance (non-colored-colored) reversibly varies due to exposure to laser beams having different wavelengths, and thin chalcogenite glass film and thin oxide based film of which crystal state varies depending on the exposure conditions of a laser beam.

Known as light storage materials are sulfide fluorescent materials such as CaS:Bi (violet blue emission), CaSrS:Bi (blue emission), ZnCdS:Cu (yellow to orange emission), which are also known as light storage fluorescent materials.

Further, Japanese Patent Publication Open to Public Inspection No. 7-11250 discloses that compounds, as a light storage fluorescent material, represented by $MAl_2O_4$ wherein M represents at least one metal element selected from the group consisting of calcium, strontium, and barium are employed as a mother crystal, and europium as an activator, as well as at least one element selected from the group consisting of lanthanum, cerium, praseodymium, neodymium, samarium, gadolinium, terbium, dysprosium, holmium, erbium, thulium, ytterbium, and lutetium, as a co-activator, are added.

Further, the patent publication also describes that in the light storage fluorescent material, europium as an activator is added in an amount of 0.002 to 20.000 mol percent with respect to the metal element represented by M, and as a co-activator, at least one element selected from the group consisting of lanthanum, cerium, praseodymium, neodymium, samarium, gadolinium, terbium, dysprosium, holmium, erbium, thulium, ytterbium, and lutetium, as a co-activator, in an amount of 0.002 to 20.000 mol percent with respect to the metal element represented by M.

In this embodiment, when IC card 1 comprises printed images comprised of a reversible thermosensitive ink/ infrared ray absorption dye or pigment, the printed image is varied by the exposure of infrared rays to the cross-section of the IC card 1. In the case of the printed image, in which a reversible thermosensitive ink/coil is adjacent to the resistance layer, the printed image is varied employing heat generated by electromagnetic induction. On the other hand, in the case of the printed image employing the light storage material, the printed image is varied by light exposure to the cross-section of the IC card 1.

As mentioned above, IC card 1 comprises variable and reversible printed image 10 in its interior. Occasionally, it is desired to confirm images of electronic parts 3 such as IC chip 3*a* as well as antenna 3*b* through its surroundings. However, providing printed image 10 prevents from confirming the images. On the other hand, by allowing the printed image 10 to be variable and reversible, it is possible to view the electronic parts 3 through its surroundings while temporarily erasing the printed image 10. By so doing, the genuineness of IC cards 1 is ascertained by detecting the reversibility of the printed image 10.

Further, the IC card 1 stores the characteristic information of variable and reversible printed image 10 in the memory of IC chip 3*a* of electronic parts 3. By comparing the practically variability and reversibility of printed image 10 to the characteristic information of variable and reversible printed image 10 stored in the memory of IC chip of electronic parts 3, it is possible to analyze the optical characteristics of the printed image before and after variation. Thus, it is possible to ascertain the genuineness of IC card 1 based on analysis results. By so doing, it is possible to more effectively thwart the forgery and falsification of IC card 1.

The characteristic information includes means information which varies the optical characteristics of printed image 10, optical characteristic information prior to variation, and optical characteristic information after variation. By analyzing the optical characteristics of printed image 10 before and after variation, it is possible to simply and assuredly ascertain the genuineness of IC card 1.

Still further, in regard to the IC card 1, by comparing the characteristic information of the variability and reversibility of printed image 10 arranged in the interior of the card to the characteristic information, which has been stored in the memory in the interior of the card, the genuineness of the card is ascertained. Subsequently, by allowing access to other information stored in the memory, it is possible to more effectively thwart forgery as well as falsification of IC card 1.

FIGS. 5 through 9(*b*) are views showing IC cards according to other embodiments.

Figure 5:
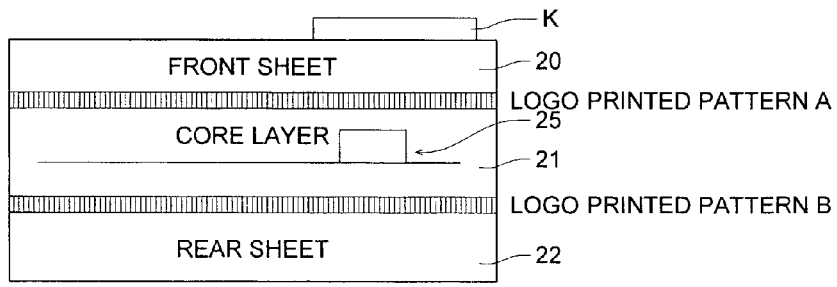
FIG. 5 is a cross-sectional view of an IC card according to another embodiment of the present invention.

As shown in FIG. 5, the IC card of the embodiment is comprised of at least front sheet 20 (a first sheet member), core layer 21 comprising electronic part 25, and rear sheet 22 (a second sheet member) while recording information such as personal information is described on the surface side. Transmission density of each sheet 20 and 22 is commonly from 0.60 to 1.80, and is preferably from 0.75 to 1.60, while reflection density of each of them is at most 0.20, and is preferably at most 0.15. Further, opacity of each of them is at least 90, and is preferably at least 94. Further, the opacity of core layer 21 is commonly less than or equal to 70, and is preferably at most 50. Still further, between core layer 21 and sheet 20, as well as between core layer 21 and sheet 22, printed image layers A and B having a transmission density of at least 0.05 and preferably at least 0.10, and a refection density of at most 0.70 and preferably at most 0.50 are provided, respectively.

The transmission density, as described in the present invention, refers to the diffuse transmission density which satisfies the spectral conditions of the visual density specified in ISO 5/3-1995, as well as the geometric conditions for determining transmission density specified in ISO 5/2-1948. The reflection density, as described in the present invention, refers to the diffuse reflection density which satisfies the spectral conditions of the visual density specified in ISO 5/3-1995, as well as the geometric conditions for determining reflection density specified in ISO 5/4.

Further, the opacity, as described in the present invention refers to the measurement value based on ISO 2471.

Core layer 21 may be comprised of a plurality of layers. In such cases, the resultant core layer 21 exhibits the characteristics previously described.

Figure 6:
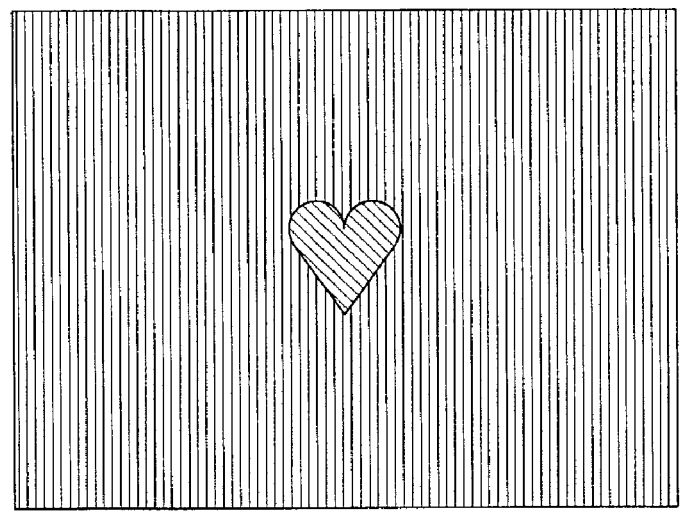
FIG. 6(a) is an upper surface view of a logo printed pattern in FIG. 5.
FIG. 6(b) is an enlarged view of a part of the heart section in FIG. 6(a).
Figure 6:
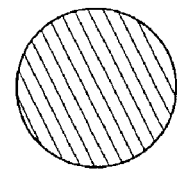
Figure 7:
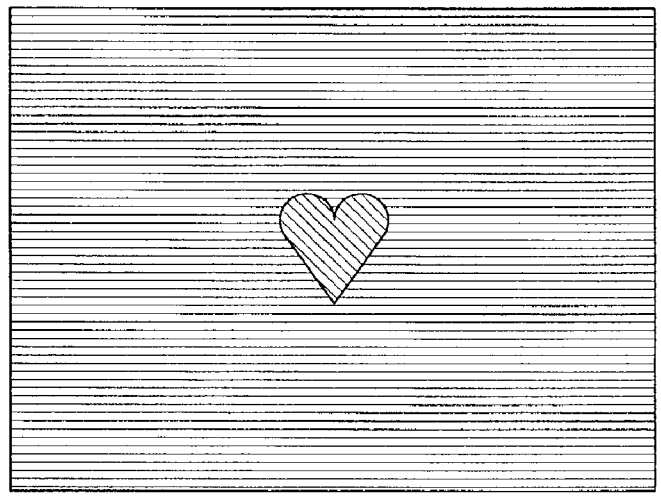
FIG. 7(a) is an upper surface view of logo printed pattern B in FIG. 5.
FIG. 7(b) is an enlarged view of a part of the heart section in FIG. 7(a).
Figure 7:
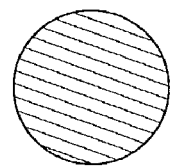
Figure 8:
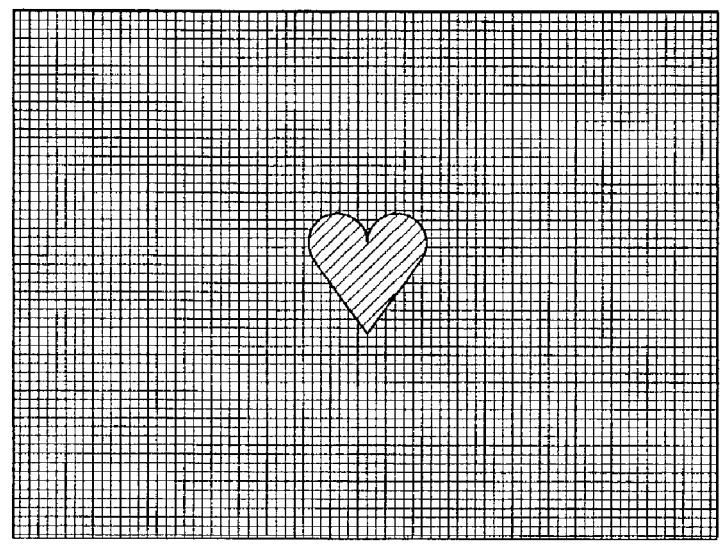
FIG. 8(a) is a view showing a logo printed pattern formed employing logo printed pattern A and logo printed pattern B.
FIG. 8(b) is an enlarged view of a part of the heart section in FIG. 8(a).
Figure 8:
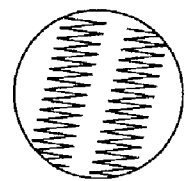

Printed image layer A is structured as shown in FIGS. 6(*a*) and 6(*b*), and has a heart-shaped pattern in striped lines in the longitudinal direction. On the other hand, printed image layer B is structured as shown in FIGS. 7(*a*) and 7(*b*), and has a heart-shaped pattern in striped lines in the lateral direction. When the printed image layer is structured as above, it is possible to clearly recognize the printed image under specified viewing conditions. For example, the printed image is not visible under normal conditions. However, as shown in FIGS. 8(*a*) and 8(*b*), when light is exposed to the rear surface or the side of IC card 1, it is possible to recognize the printed image even in the presence of electronic parts such as a chip and an antenna.

Figure 9:
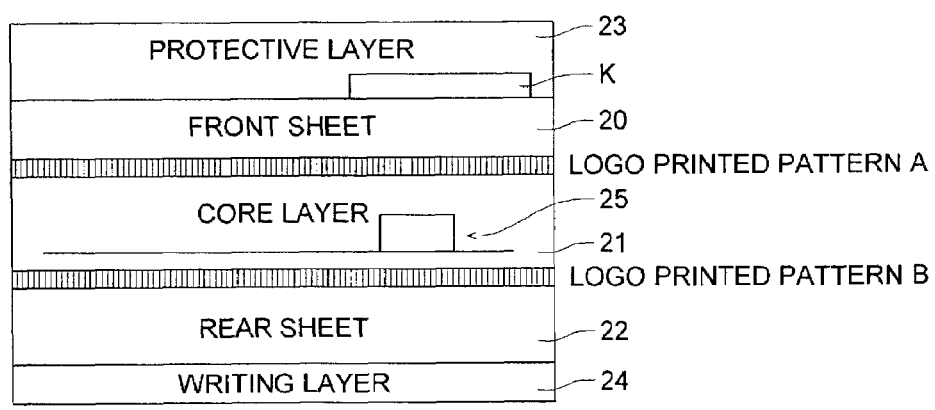
FIG. 9 is a cross-sectional view of an IC card according to another embodiment of the present invention.

Further, as shown in FIG. 9, IC card of the embodiment is provided with protective layer 23 covering front sheet 20, as well as with writing layer 24 covering rear sheet 22.

Under normal conditions, it is difficult to see internally provided electronic parts 25 due to the fact that the transmission density of the white support of each of sheets 20 and 22 is from 0.60 to 1.80, whereby it is possible to enhance the card quality. Further, when the reflection density is adjusted to less than or equal to 0.20, the printed image becomes clear.

By constituting an IC card as shown in the embodiment above, it is possible to clearly recognize the printed image under specified viewing conditions.

For example, when the card is viewed while light is exposed to its side as well as its rear surface, it is possible to recognize printed images A and B as a printed image even in the portion having electronic part 25 such as a chip and an antenna in the interior of the IC card.

Further, in an IC card comprised of at least front sheet 20, core layer 21, and rear sheet 22, printed image layer A is provided between the front sheet 20 and the core layer 21 while printed image B is provided between the core sheet 21 and the rear sheet 22.

It is preferable that printed image layers A and B are positioned in the range of 3 to 30 percent from the uppermost surface of the card with respect to the card thickness. When it is assumed that the printed image is polished from the surface or peeled off, it is preferable that the printed image layers A and B are positioned near the surface of the card. However, the printed images, which are positioned too close to the surface, may be noticed through the surface. Therefore, the printed image layers are most preferably positioned in the range of 5 to 25 percent from the uppermost surface with respect to the card thickness.

Printed image layers A and B may be provided employing offset printing, gravure printing, flexographic printing, letterpress printing, and transfer foil transfer. The thickness of printed image layers A and B is preferably at most 5 μm, and is more preferably at most 3 μm. When the thickness exceeds the upper limit, the printed image layers come into direct contact with electronic parts 25 such as an IC chip and results in unevenness of the card surface.

It is preferable that printed image layers A and B are provided between the white support of front sheet 20 and rear sheet 22, and core layer 21, and further, are provided so as to firmly adhere to the white support surface. By so doing, when peeled together with the white support, printed image layers A and B are separated from electronic parts 25. In this case, it is preferable that the reflection density characteristics of the white support are as much as possible identical to those of printed image layers A and B. Accordingly, it is more effective when white support/printed image layers A and B and the same color solid printing layer/printed image layers A and B are achieved. Incidentally, the relationship may be altered to white support/printed image layer/printed image layer and the same color solid printing layer. Particularly preferable printed image layers A and B are such that when forcibly peeled off, those are broken.

Further, it is preferable that by changing the pattern of printed image layers A and B, each of the directly viewed images is different from each of the images viewed by exposing light to the rear surface of the card comprised of the pattern.

FIGS. 6(a) through 8(b) show the formation of printed images employing moire fringes formed by superimposing fine line patterns. Moire fringes, as described herein, refer to rough interval patterns formed by connecting intersections which are formed by superimposing patterns having two periodic intensity distributions. Such phenomena are called moire phenomena. For example, printed image A in which many fine lines are arranged at an even interval and the desired pitch and printed image B, being similar to the printed image A, in which many fine lines are arranged at an angle different from printed image A, are provided at an appropriate position of the card.

When a card is formed by adhering a front sheet having the printed image of FIG. 6(a) to a rear sheet having the printed image of FIG. 7(a) while interposing a core layer, it is possible to view the resultant card as shown in FIG. 8(a). FIGS. 6(a) through 8(b) are enlarged views of a part of the heart section of each of FIGS. 6(a) through 8(a). Herein, the angle between lines of FIG. 6(a) and FIG. 7(b) is deviates slightly.

It is possible to observe moire fringes only at the specified position of the portion where the angle of one group consisting of many fine lines is slightly different from the angle of another group consisting of many fine lines. On the other hand, by arranging the fine lines approximately at a right angle, the moire fringes are not formed and such fine lines result in effect as a uniform shielding layer. As a result, it is possible to design front sheet 20 to be thinner and to employ a base material sheet having a low shielding capability. Further, a fine line pattern may be formed employing a regularly arranged dot pattern. In the case of the dot, it is possible to generate moire fringes by superimposing dot arrangements while varying the angle between the arrangements.

Employed as printed image layers A and B are those prepared commonly by dispersing, for example, pigments such as titanium white, magnesium carbonate, zinc oxide, barium sulfate, silica, talc, clay, calcium carbonate, and carbon black to binders such as acryl based resins, polyester based resins, petroleum based resins, and urethane based resins.

Incidentally, the reflection density and opacity of printed image layers A and B exhibit effective results by setting those in the specified range with reference to characteristics of front sheet 20 as well as rear sheet 22. It is preferable that front sheet 20 as well as rear sheet 22 is comprised of a white support. Listed as white supports are, for example, single layers as well as laminates of at least two layers of synthetic resinous sheets comprised of polyester resins such as polyethylene terephthalate, polybutylene terephthalate, and polyethylene terephthalate/isophthalate copolymers; polyolefin resins such as polyethylene, polypropylene, and polymethylpentane; polyethylene fluoride based resins such as polyvinyl fluoride, polyvinylidene fluoride, polyethylene tetrafluoride, and ethylene-ethylene tetrafluoride copolymers; polyamides such as nylon 6 and nylon 6.6; vinyl polymers such as polyvinyl chloride, vinyl chloride/vinyl acetate copolymers, ethylene/vinyl acetate copolymers, ethylene/vinyl alcohol copolymers, polyvinyl alcohol and vinylon; biodegradable resins such as biodegradable aliphatic polyester, biodegradable polycarbonate, biodegradable polylactic acid, biodegradable polyvinyl alcohol, biodegradable cellulose acetate, and biodegradable polycaprolactone; cellulose based resins such as cellulose triacetate and cellophane; acryl based resins such as methyl polymethacrylate, ethyl polymethacrylate, ethyl polyacrylate, and butyl polyacrylate; polystyrene; polycarbonate; polyallylate; and polyimide.

The thickness of the white supports (sheet members) employed in the present invention is commonly from 30 to 300 μm, and is preferably from 50 to 200 μm.

It is possible to include electronic parts 25 in the interior of core layer 21. Electronic parts 25, as described herein, refer to information recording members which specifically include an IC chip which electrically stores the information of a bearer of the electronic card and a coil-shaped antenna connected to the IC chip. In some cases, the electronic parts may include capacitors and resistors.

The present invention is not limed to the electronic parts as long as electronic parts 25 include parts necessary for information recording members. An IC module comprises an antenna coil. When comprising an antenna pattern, employed may be any of the methods of conductive paste printing, copper foil etching, and coil welding. Employed as printed boards are thermoplastic films such as polyester. When heat resistance is further demanded, polyimides are advantageous. Known as methods to adhere the IC chip to the antenna pattern may be various methods such as a method using electrically conductive adhesives (EN-4000 Series manufactured by Hitachi Kasei Kogyo and XAP Series manufactured by Toshiba Chemical) such as silver paste, copper paste, and carbon paste; a method using anisotropic electrically conductive film (Anisolm manufactured by Hitachi Kasei Kogyo); and a method using soldering adhesion. Any of these methods may be employed. Parts including IC chips are arranged at the specified positions, and resins are filled. During the operation, in order to solve problems in which adhered parts are separated due to the shearing force of the resin fluid and the surface smoothness is degraded due to the flow of resins and cooling, it is preferable that a resinous layer is previously formed on a base sheet and in order to seal the parts in the resinous layer, the electronic part is included in a porous resinous film, a porous foam resinous film, a flexible resinous sheet, a porous resinous sheet or an unwoven cloth sheet. It is possible to employ a method described in, for example, Japanese Patent Application No. 11-105476. Further, the point pressure strength of the IC chip is relatively low. Therefore, it is preferable to provide a reinforcing plate adjacent to the IC chip. The total thickness of the electronic parts is preferably from 10 to 300 μm, is more preferably from 30 to 300 μm, and is still more preferably from 30 to 250 μm.

Incidentally, by combining the printed images with the printed images provided to electronic parts, it is possible to have the resultant combined images look as if they are the specified patterns. Further, it is possible to provide patterns which are analogous to the electronic parts. By so doing, electronic parts are capable of camouflage or disguise. As a result, it is possible to thwart intentional attack to the electronic parts.

Core layer 21 may be comprised of hot melt adhesives or moisture hardening type adhesives. Listed as main components of the hot melt adhesives are, for example, ethylene-vinyl acetate copolymers (EVA), polyesters, polyamides, thermoplastic elastomers, and polyolefins. Polyamide based hot melt adhesives include Macromelt Series, manufactured by Henkel Corp. In the present invention, preferred are thermoplastic elastomers based hot melt adhesives, which include, for example, Flex TR and Clayton Series, manufactured by Shell Chemical Co., Toughprene, manufactured by Asahi Kasei Co., Toughden, manufactured by Firestone Synthetic Rubber and Latex Co., and Solprene 400 Series, manufactured by Phillips Petroleum Co. Polyolefin based hot melt adhesives include Sumichik, manufactured by Sumitomo Kagaku Co., Bistack, manufactured by Chisso Sekiyu Kagaku Co., Yukatack, manufactured by Mitsubishi Yuka Co., Macromelt Series, manufactured by Henkel Corp., Toughmer, manufactured by Mitsui Sekiyu Kagaku Co., APAO, manufactured by Ube-Lexen Co., East Bond, manufactured by Eastman Chemical Co., and A-FAX, manufactured by Hercules Co. Listed as one example of moisture hardening type adhesives is a compound comprised of urethane polymers, as a major component, having an isocyanate group at the molecular terminal in which the isocyanate group is activated upon reacting with the isocyanate group and forms a crosslinking structure upon further reacting with prepolymers.

Listed as moisture hardening type adhesives which can be employed at a relatively low temperature are, for example, TE030 and TE100, manufactured by Sumitomo 3M Limited., Highbon 4820, manufactured by Hitachi Kasei Polymer Co., Bond Master 170 Series, manufactured by Kanebo NSC Co., and Macroplast QR 3460, manufactured by Henkel Corp.

Core layer 21, comprising light storage agents, emits light for some time after high intensity light is exposed to the cross-section of the card comprised of the core layer 21. As a result, even after terminating the exposure to the cross-section, it is possible to view water logos for some time in the same manner as while exposed.

Therefore, the higher the opacity of the core layer, the more preferred it is. Further, a transparent layer may be provided so as to be adjacent to the core layer so that the desired effects are obtained.

As mentioned above, known as light storage materials are sulfide fluorescent materials such as $CaS:Bi$ (violet blue emission), $CaSrS:Bi$ (blue emission), $ZnCdS:Cu$ (yellow to orange emission), which are also known as light storage fluorescent materials. In addition, employed are light storage fluorescent materials described in Japanese Patent Publication Open to Public Inspection No. 7-11250.

Figure 10:
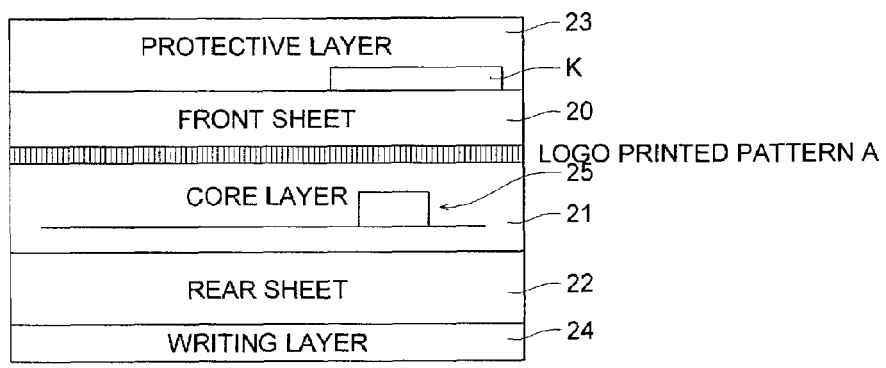
FIG. 10 is a cross-sectional view of an IC card according to another embodiment of the present invention.
Figure 11:
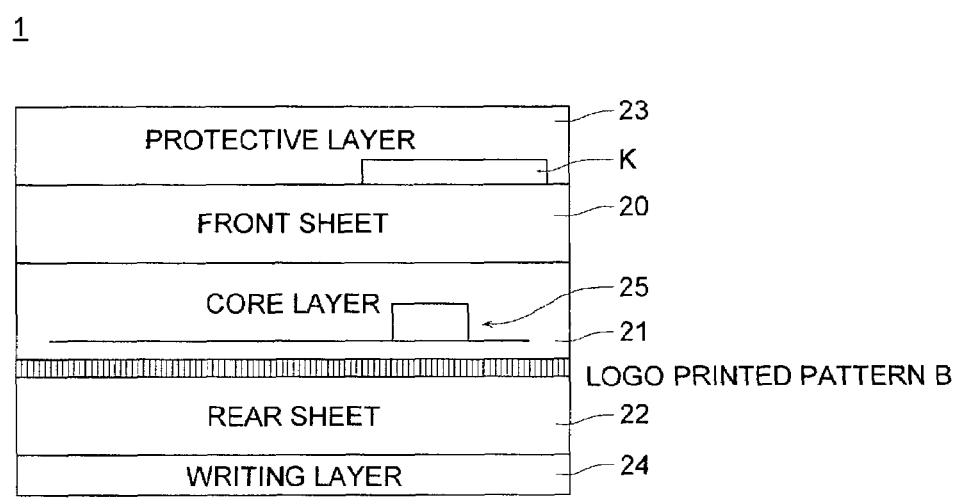
FIG. 11 is a cross-sectional view of an IC card according to still another embodiment of the present invention.

Further, as shown in FIGS. 9 through 11, rear sheet 22 of IC card 1 may be provided with writing layer 24. Still further, printed image layer B is removed from IC card 1 shown in FIG. 10, while printed image layer B is removed from IC card 1 as shown in FIG. 11.

Writing layer 24 is the layer which provides a writing rear surface of IC cards. It is possible to prepare the writing layer 24 by incorporating minute inorganic powders comprised of, for example, calcium carbonate, talc, diatomaceous earth, titanium oxide, and barium sulfate in a film comprised of thermoplastic resins (polyolefins such as polyethylene and various types of copolymers). Further, the writing layer 24 may be prepared based on the "writable layer" described in Japanese Patent Publication Open to Public Inspection No. 1-205155. The writing layer 24 is formed on the surface on the side of the IC card on which a plurality of layers is not formed.

Further, protective layer 23 is provided on front sheet 20. When the protective layer 23 is applied onto an image recording medium for protection, coating is carried out employing a method selected from conventional methods known in the art, such as a rotary coating method, a wire bar coating method, a dip coating method, a felt coating method, an air knife coating method, a spray coating method, an air spray coating method, an electrostatic air spray coating method, a roll coating method, a blade coating method, and a curtain coating method. When coated, coating weight varies depending on the intended use, but, for example, it is preferably from 0.05 to 50.00 $g/m^2$ in terms of solids. Incidentally, as the coating weight decreases, the apparent sensitivity increases. However, the layer properties as well as chemical resistance properties of the image forming layer are degraded.

Employed as devices to harden the resultant coating may be all which generate electromagnetic waves. Listed as such devices may be, for example, lasers, light emitting diodes, xenon flash lamps, halogen lamps, carbon arc lamps, metal halide lamps, tungsten lamps, mercury arc lamps, and non-electrode light sources. Of these, preferably listed are xenon lamps, halogen lamps, carbon arc lamps, metal halide lamps, tungsten lamps, and mercury arcs. Energy applied to hardening may be suitably controlled by adjusting the exposure distance, time and intensity, depending on the type of polymerization initiators.

Further, it is preferable that the protective layer be provided employing transfer foil, hardening foil, hologram transfer foil, and forming methods described in Japanese Patent Publication Open to Public Inspection No. 09-050229 and Japanese Patent Application No. 11-319068.

A card, which is structured as described below, was prepared as an example relating to the present invention.

TABLE 1

| Samples Nos. | | 1 | 2 | 3 | 4 | 5 |
|---|---|---|---|---|---|---|
| Thickness (mm) | Front sheet | 0.50 | 0.95 | 0.12 | 0.12 | 0.20 |
| | Logo Printed Pattern | Exist | Exist | Exist | Exist | Exist |
| | Core layer | 0.37 | 0.31 | 0.26 | 0.26 | 0.36 |
| | Rear Sheet | 0.80 | 0.95 | 0.12 | 0.12 | 0.20 |
| | Total Thickness | 0.50 | 0.50 | 0.50 | 0.50 | 0.76 |
| Transmission Density | Front sheet | 0.59 | 1.29 | 0.77 | 1.45 | 0.12 |
| | Core layer | 0.24 | 0.18 | 0.18 | 0.18 | 0.18 |
| | Logo Printed Pattern | 0.05 | 0.15 | 0.21 | 0.30 | 0.25 |
| | Rear Sheet | 0.65 | 1.29 | 0.77 | 1.45 | 1.12 |
| Reflection Density | Front sheet | 0.10 | 0.05 | 0.07 | 0.06 | 0.06 |
| | Logo Printed Pattern | 0.34 | 0.22 | 0.33 | 0.35 | 0.28 |
| | Rear Sheet | 0.10 | 0.05 | 0.07 | 0.06 | 0.06 |
| Opacity | Front sheet | 91.6 | 99.3 | 94.6 | 99.5 | 97.9 |
| | Core layer | 89.2 | 47.9 | 39.3 | 39.3 | 48.5 |
| | Rear Sheet | 93.8 | 99.3 | 94.6 | 99.5 | 97.9 |

In Samples 2 through 5, the printed pattern, which was viewed by light exposure to the rear surface of the card, was different from that when viewed by light exposure to the cross-section thereof.

In Sample 1, the printed pattern did not vary by light exposure to the cross-section of the card.

EFFECTS OF THE INVENTION

The present invention makes it possible to prepare IC cards which exhibit excellent thwarting properties against forgery and falsification.

What is claimed is:

1. An IC card comprising:
  a core layer comprising therein an electronic element having a memory medium;
  an image receptive layer recording at least either text information or image information; and
  an optical variation element layer comprising an optical variation element,
  wherein the memory medium stores a characteristic information of the optical variation element layer and at least either the text information or the image information.

2. The IC card of claim 1, wherein the characteristic information comprises a measurement position information of the optical variation element, the incident angle of exposure light, the measurement angle and colorimetric values.

3. The IC card of claim 1, wherein the optical variation element layer is positioned on the opposite side of the image receptive layer with respect to the core layer.

4. A card certification method utilizing the IC card of claim 1, comprising:
  reading the characteristic of the optical variation element image layer and the characteristic information of the optical variation element image layer stored in the memory medium;
  comparing the characteristic of the optical variation element image layer to the characteristic information of the optical variation element layer stored in the memory medium; and
  permitting access to information stored in the memory medium other than the characteristic information of the optical variation element image layer when the characteristic of the optical variation element layer agrees with the characteristic information of the optical variation element layer stored in a memory medium.

5. An IC card comprising:
  a core layer comprising therein an electronic element having a memory medium;
  an image receptive layer recording at least either text information or image information; and
  a variable and reversible printed image in the interior of the IC card,
  wherein the memory medium stores a characteristic information of the printed image and at least either the text information or the image information.

6. The IC card of claim 5, wherein the characteristic information of the printed image stored in the memory medium comprising at least one of an optical characteristic information before variation of the printed image and an optical characteristic information after variation of the printed image.

7. The IC card of claim 6, wherein the characteristic information of the printed image stored in the memory medium comprises both of the optical characteristic information before variation of the printed image and the optical characteristic information after variation of the printed image.

8. The IC card of claim 7, wherein the characteristic information of the printed image stored in the memory medium further comprises information of means which varies the optical characteristics of the printed image.

9. The IC card of claim 5, wherein the IC card comprises a reflection layer, and the printed image is provided between the reflection layer and the core layer.

10. The IC card of claim 5, wherein printed image is a logo printed pattern.

11. A card certification method utilizing the IC card of claim 5, comprising:
  reading the characteristic of the printed image and the characteristic information of the printed image stored in the memory medium;

comparing the characteristic of the printed image to the characteristic information stored in the memory medium; and permitting access to information stored in the memory medium other than the characteristic information of the printed image when the characteristic of the printed image agrees with the characteristic information of the printed image stored in the memory medium.

12. An IC card comprising:

a core layer comprising therein an electronic element having a memory medium;

a first sheet member provided on the core layer;

a second sheet member provided on the opposite side of the first sheet member;

an image recording section provided on the outside of at least one of the first sheet member and the second sheet member; and a printed image layer having a printed image provided either between the first sheet member and the core layer or between the second sheet member and the core layer wherein each of the first sheet member and the second sheet member has a transmission density of from 0.60 to 1.80, a reflection density of at most 0.20 and an opacity of at least 90; the core layer has an opacity of not more than 70; and the printed image layer has a transmission density of not less than 0.05 and a reflection density of not more than 0.70.

13. The IC card of claim 12, wherein the printed image layer is positioned in the range of 3 to 30 percent from the surface of the IC card with respect to the card thickness.

14. The IC card of claim 12, the core layer comprises a light storage material.

15. The IC card of claim 12, a first printed image layer is provided between the first sheet member and the core layer, and a second printed image layer is provided between the second sheet member and the core layer.

16. The IC card of claim 15, wherein the printed image of the first printed image layer is different from the printed image of the second printed image layer in at least one of the position, the shape and the direction viewed from the upper surface of the IC card.

17. The IC card of claim 15, wherein each of the printed image of the first printed image layer and the printed image of the second printed image layer is comprised of an assembly of regular patterns, the assembly being designed to generate a new image due to moiré effect when the first printed image layer and the second printed image layer are viewed upon being superimposed.

18. The IC card of claim 12, wherein a characteristic information of the printed image layer is stored in the memory medium.

19. A card certification method utilizing the IC card of claim 12, comprising:

a first recognizing step to recognize the printed image from the surface of the IC card while exposing the back surface of the IC card to illuminant light;

a second recognizing step to recognize the printed image from the surface of the IC card while exposing the back surface and the side of the IC card to illuminant light; and a comparing step to compare the printed image recognized in the first recognizing step to the printed image recognized in the second recognizing method.

* * * * *